(12) United States Patent
Mathew

(10) Patent No.: US 11,971,187 B2
(45) Date of Patent: Apr. 30, 2024

(54) QUICK HEAT ALGORITHM FOR MODULATING HEATING EQUIPMENT

(71) Applicant: Johnson Controls Tyco IP Holdings LLP, Milwaukee, WI (US)

(72) Inventor: Rakesh Mathew, Wichita, KS (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 186 days.

(21) Appl. No.: 17/365,814

(22) Filed: Jul. 1, 2021

(65) Prior Publication Data
US 2023/0003412 A1     Jan. 5, 2023

(51) Int. Cl.
| F24F 11/65 | (2018.01) |
| F23N 1/00 | (2006.01) |
| F24D 5/04 | (2006.01) |
| F24F 11/80 | (2018.01) |
| G05B 15/02 | (2006.01) |
| F24F 110/10 | (2018.01) |

(52) U.S. Cl.
CPC .............. *F24F 11/65* (2018.01); *F23N 1/005* (2013.01); *F24D 5/04* (2013.01); *F24F 11/80* (2018.01); *G05B 15/02* (2013.01); *F23N 2235/16* (2020.01); *F23N 2241/02* (2020.01); *F24F 2110/10* (2018.01); *G05B 2219/2614* (2013.01)

(58) Field of Classification Search
USPC ........................................................ 700/276
See application file for complete search history.

(56) References Cited

U.S. PATENT DOCUMENTS

| 5,340,028 | A | * | 8/1994 | Thompson | ........... F24D 19/1084 236/46 E |
| 5,706,190 | A | * | 1/1998 | Russ | ..................... G01D 4/004 165/205 |
| 9,945,567 | B2 | | 4/2018 | Perez et al. | |
| 10,281,165 | B2 | | 5/2019 | Perez et al. | |
| 10,753,623 | B2 | | 8/2020 | Harris | |
| 2011/0214437 | A1 | | 9/2011 | Jeong et al. | |
| 2013/0230812 | A1 | * | 9/2013 | Schultz | ............... F24D 19/1084 431/70 |
| 2014/0070014 | A1 | * | 3/2014 | Bohan | ................. F24D 19/1009 236/1 A |
| 2017/0211835 | A1 | * | 7/2017 | Perez | ...................... F24F 11/46 |

OTHER PUBLICATIONS

Haier Heat Pump Water Heater, Installation and Service Manual, Model HP200M1 & HP250M1, 2014, pp. 1-31.

* cited by examiner

*Primary Examiner* — Emilio J Saavedra
(74) *Attorney, Agent, or Firm* — Fletcher Yoder, P.C.

(57) ABSTRACT

A system includes a modulating furnace and control circuitry. The control circuitry is configured to receive a call for heating associated with a quick heat cycle. In response to the call for heating, the control circuitry is also configured to operate the modulating furnace in a quick heat operating mode for a threshold time period. Subsequent to the threshold time period, the control circuitry is also configured to operate the modulating furnace in a modulating heat operating mode.

20 Claims, 9 Drawing Sheets

QUICK HEAT ALGORITHM FOR MODULATING HEATING EQUIPMENT

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments (e.g., enclosed spaces). For example, an HVAC system may include one or more heat exchangers configured to place an air flow in a heat exchange relationship with a working fluid circulated by the heat exchanger. For example, a heat exchanger may circulate a refrigerant of a vapor compression circuit, combustion products generated by a furnace, or another type of working fluid. In general, the heat exchange relationship(s) may cause a change in pressures and/or temperatures of the air flow, the working fluid, or both. After exchanging heat via the heat exchanger, the air flow may be directed toward the environment (e.g., enclosed space) to condition the environment. Control features may be employed to control the above-described features such that conditions of the environment are adjusted in a desired manner. Unfortunately, traditional HVAC systems may be ill-equipped to determine whether, how, and/or when to operate heat exchangers to quickly and/or efficiently provide conditioning to the environment (e.g., enclosed space), which may result in inefficient heat exchange and/or extended amounts of time to condition the environment and satisfy a call for conditioning. Accordingly, it is now recognized that improved operation of heat exchangers is desired.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a controller of a modulating furnace of a heating, ventilation, and air conditioning (HVAC) system includes a tangible, non-transitory, computer-readable medium having computer-executable instructions stored thereon that, when executed, are configured to cause processing circuitry to receive a call for heating and associate the call for heating with a quick heat cycle. The instructions stored thereon, that when executed, are configured to cause the processing circuitry to also operate the modulating furnace in a quick heat operating mode for a threshold time period in response to the call for heating being associated with the quick heat cycle and operate the modulating furnace in a modulating heat operating mode subsequent to expiration of the threshold time period.

A heating, ventilation, and air conditioning (HVAC) system includes a modulating furnace and control circuitry configured to receive a call for heating associated with a quick heat cycle. In response to the call for heating, the control circuitry is configured to operate the modulating furnace in a quick heat operating mode for a threshold time period and subsequent to the threshold time period, operate the modulating furnace in a modulating heat operating mode.

A heating, ventilation, and air conditioning (HVAC) system includes a modulating furnace and a processor configured to receive a call from a thermostat. In response to the call, the processor is configured to execute a quick heat algorithm to determine a number of heating cycles between the call and a previous call associated with the quick heat algorithm and compare the number of heating cycles to a threshold cycle amount. In response to the number of heating cycles meeting or exceeding the threshold cycle amount, the processor is configured to execute the quick heat algorithm to also initiate operation of the modulating furnace and operate the modulating furnace in a quick heat operating mode. In response to the number of heating cycles being below the threshold cycle amount, the processor is configured to execute the quick heat algorithm to operate the modulating furnace in a modulating heat operating mode.

BRIEF DESCRIPTION OF THE DRAWINGS

Various aspects of this disclosure may be better understood upon reading the following detailed description and upon reference to the drawings in which.

DETAILED DESCRIPTION

Figure 1:
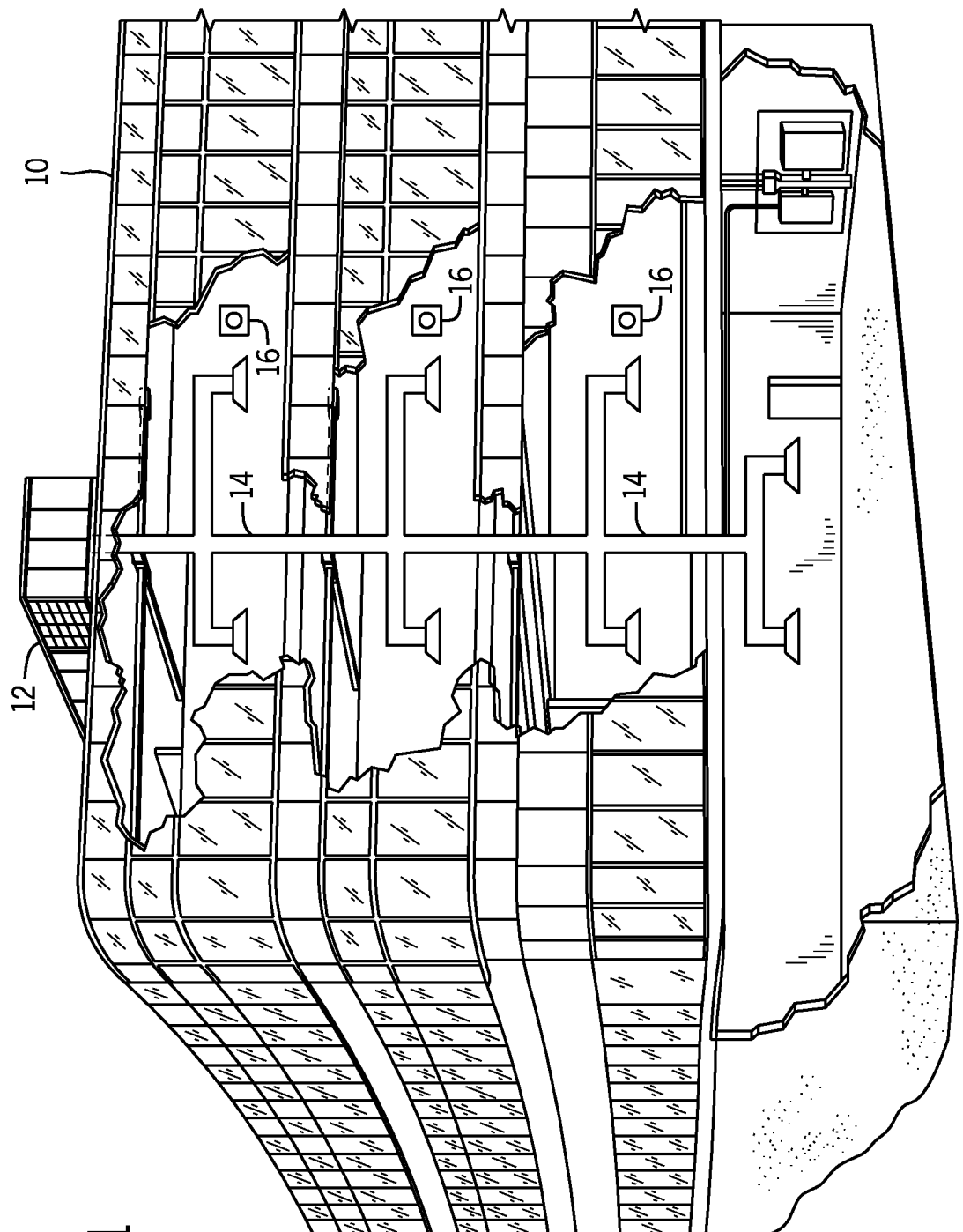
FIG. 1 is a perspective view of a building having an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to systems and methods for improving operation of heat exchangers of HVAC systems. More particularly, present embodiments include systems and methods for operating a heat exchanger (e.g., a modulating furnace) in multiple operating modes, including a quick heat operating mode or cycle. As used herein, a "quick heat cycle" refers to an operating mode for a modulating furnace in which one or more operating parameters of the modulating furnace is at an upper threshold (e.g., upper threshold value) and/or the modulating furnace is operated at a full (e.g., predefined maximum heating, maximum, 100 percent) capacity. For example, in the quick heat cycle, a fuel input rate to burner(s) of the modulating furnace may be at an upper threshold (e.g., maximum) value and/or an exhaust flow rate of a blower of the modulating furnace may be at an upper threshold (e.g., maximum) value. Additionally or alternatively, the predefined maximum heating capacity may be a selected (e.g., based on a user input received via a user interface) limit of the heating capacity of the modulating furnace. The modulating furnace may also be operated in a modulating heat mode or cycle. As used herein, a "modulating heat cycle" refers to an operating mode for a modulating furnace during which a capacity (e.g., heat output, rate of heat transfer, etc.) of the modulating furnace is modulated or varied. For example, in the modulating heat cycle, a fuel input rate to burner(s) of the modulating furnace and/or an exhaust flow rate of a blower of the modulating furnace may be adjusted or modulated, such as based on feedback and/or control signals from a controller of the HVAC system. In some embodiments, the feedback may include a temperature difference between a set point temperature and a measured (e.g., current) temperature in an environment (e.g., enclosed space) conditioned by the modulating furnace. As discussed below, present embodiments also include systems and methods to determining whether, how, and when to initiate the various operating modes of the modulating furnace.

A modulating furnace, such as a variable speed furnace, is configured to adjust an amount of heat output and/or temperature of heated air generated by the modulating furnace to provide heating to a conditioned space at a faster rate and/or more efficiently than traditional (e.g., fixed rate) furnaces. The modulating furnace may include one or more burners configured to receive fuel (e.g., gas) from a fuel source. A fuel valve (e.g., gas valve) associated with the modulating furnace may be controlled to supply a variable amount of fuel to the burner. In accordance with present embodiments, an amount and/or rate of fuel supplied to the burner may be based on an operating mode (e.g., a selected operating mode) of the modulating furnace. For example, the fuel valve may be adjusted to increase a fuel input rate to the modulating furnace during a quick heat cycle of the modulating furnace. The burners may also receive an oxidant (e.g., air), mix the oxidant with the fuel, and ignite the fuel-oxidant mixture to generate combustion products routed through heat exchange tubes or coils of the modulating furnace. The modulating furnace may also include one or more blowers (e.g., draft inducer blowers) configured to draw exhaust gas (e.g., combustion products) through the heat exchange tubes of the modulating furnace. For example, a blower associated with the modulating furnace may be controlled to generate a varying flow rate of the exhaust gas through the heat exchange tubes. In some embodiments, during the quick heat cycle, the blower may be adjusted to increase a flow rate of the exhaust gas through the heat exchange tubes. To enable the features described herein, the modulating furnace and/or the HVAC system may include a control system (e.g., a controller) to regulate operation of the modulating furnace (e.g., the fuel valve, the blower, etc.).

In accordance with present embodiments, a controller of the HVAC system and/or modulating furnace may receive a call (e.g., from a thermostat) to provide conditioning (e.g., heating) to a space conditioned by the HVAC system. The controller may include a processor and a memory, and the memory may include instructions stored thereon that, when executed by the processor, cause the controller to selectively execute one of the various operating modes of the modulating furnace. For example, instructions may include a quick heat algorithm. In the manner described below, the controller may execute the quick heat algorithm and, based on an output from the quick heat algorithm, initiate operation of the modulating furnace in the quick heat operating mode for a threshold time period. After the threshold time period, the controller may operate the modulating furnace in the modulating heat operating mode (e.g., if the call for conditioning remains after operation of the modulating furnace in the quick heat operating mode).

The quick heat algorithm may initiate operation of the quick heat operating mode based on various inputs, calculations, and/or factors. For example, the quick heat algorithm may initiate the quick heat operating mode based on a user input. The quick heat algorithm may also initiate the quick heat operating mode based on whether the quick heat operating mode was initiated in recent cycles of the modulating furnace. For example, the quick heat algorithm may determine a number of operating cycles completed (e.g., operating cycles executed to satisfy respective calls for conditioning) since execution of the last quick heat cycle. The quick heat algorithm may initiate the quick heat cycle based on a determination that the number of operating cycles completed without implementing the quick heat cycle meets or exceeds a threshold number or value. In general, the above-described quick heat algorithm improves heat exchange efficiency and/or reduces conditioning time relative to traditional systems. The improvements and benefits of the disclosed techniques is described in further detail below.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration loop to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
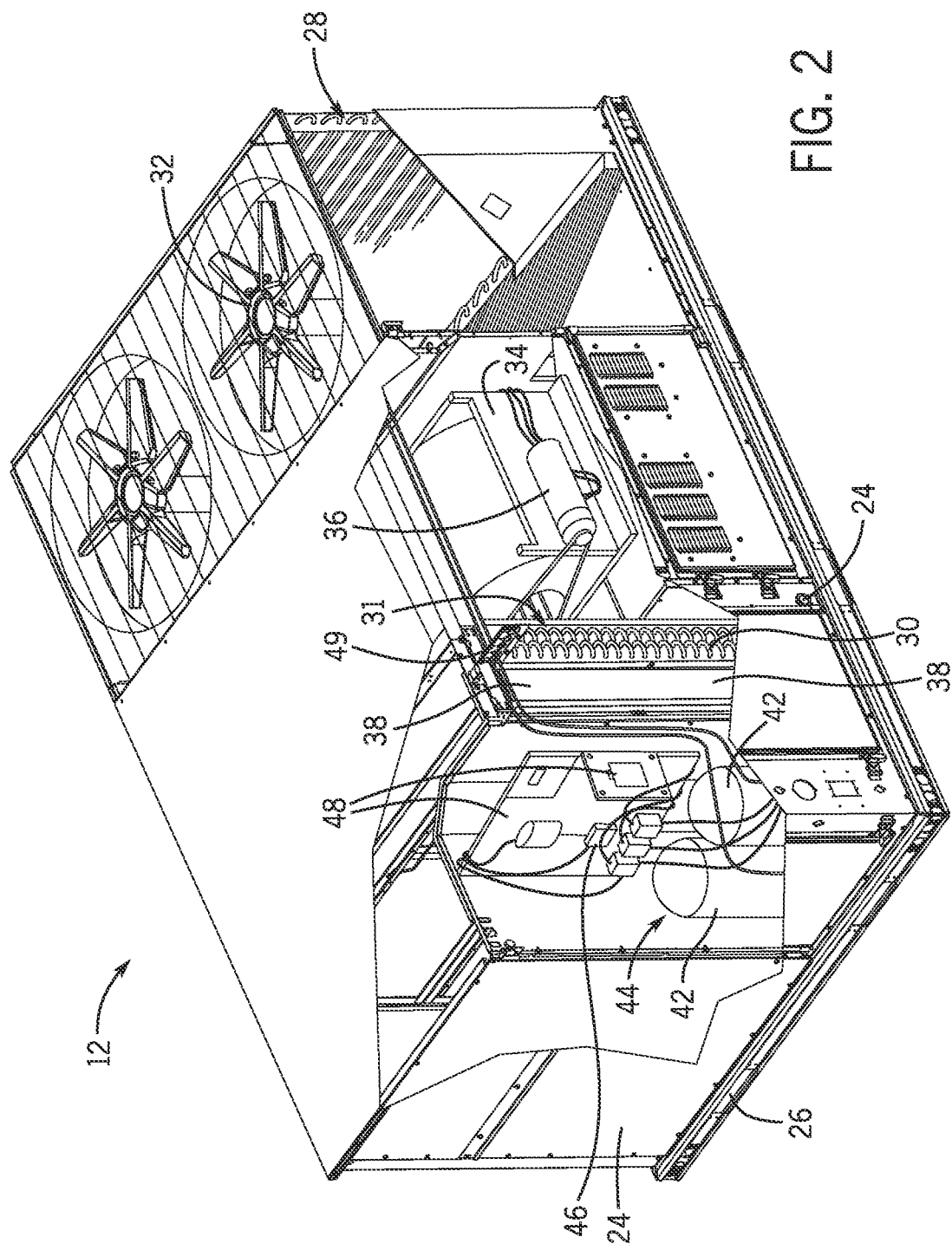
FIG. 2 is a perspective view of an embodiment of a packaged HVAC unit that may be used in an HVAC system, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal loop in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal loop. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
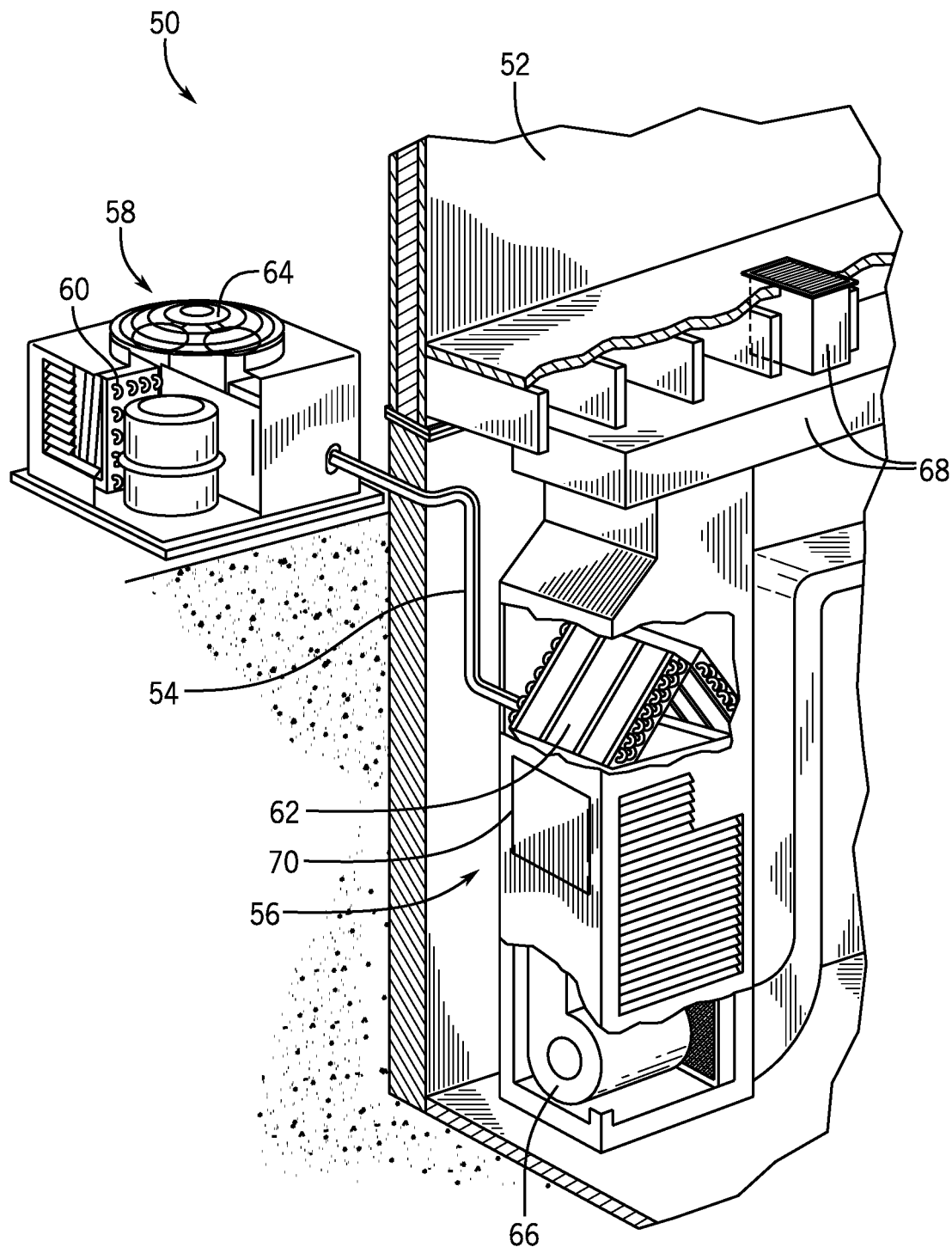
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration loop temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower or fan 66 passes over the tubes or pipes and extracts heat from the combustion products. The heated air may then be routed from the furnace system 70 to the ductwork 68 for heating the residence 52.

Figure 4:
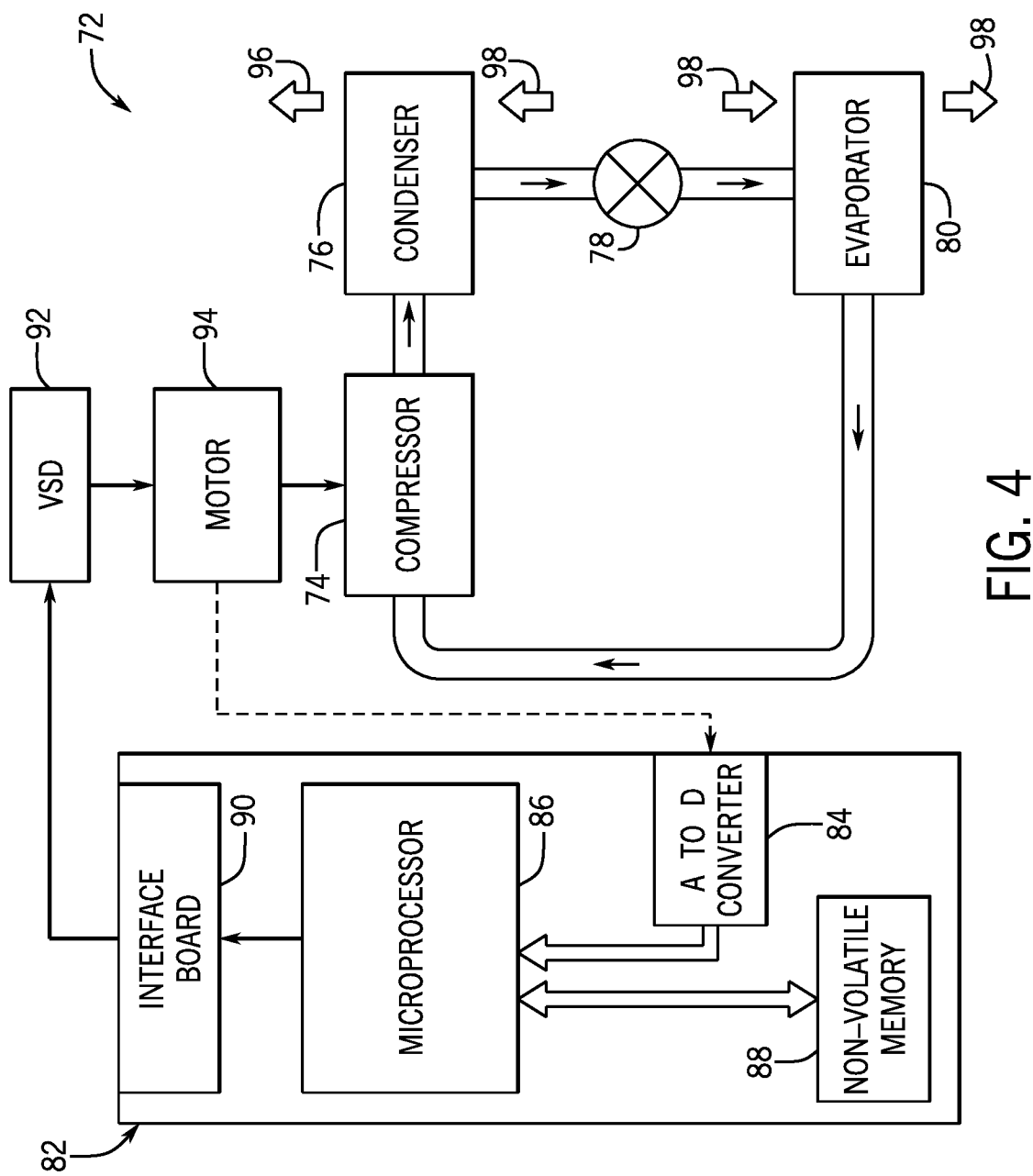
FIG. 4 is a schematic illustration of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the loop.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Further, any of the systems illustrated in FIGS. 1-4 may include a furnace, such as a modulating furnace, and a controller configured to implement a quick heat algorithm that enables improved operation of the modulating furnace. For example, the quick heat algorithm is configured to determine whether, how, and/or when to initiate a quick heat cycle operation of the modulating furnace. As previously described, a modulating furnace, such as a variable speed furnace, is configured to adjust an amount of heat output by the modulating furnace and/or temperature of heated air generated by the modulating furnace. In this way, the modulating furnace is configured to provide conditioning (e.g., heating) to a conditioned space more quickly and/or more efficiently than traditional furnaces. While modulating furnaces are described in detail below, it should be understood that the quick heat algorithm and techniques described in in the present disclosure may also be utilized with modulating cooling systems, such as a refrigerant-based evaporator configured to absorb heat from an air flow, modulating heating systems including additional or other components than those described herein, such as an electric heater, modulating dehumidification systems, or other variable conditioning systems.

Figure 5:
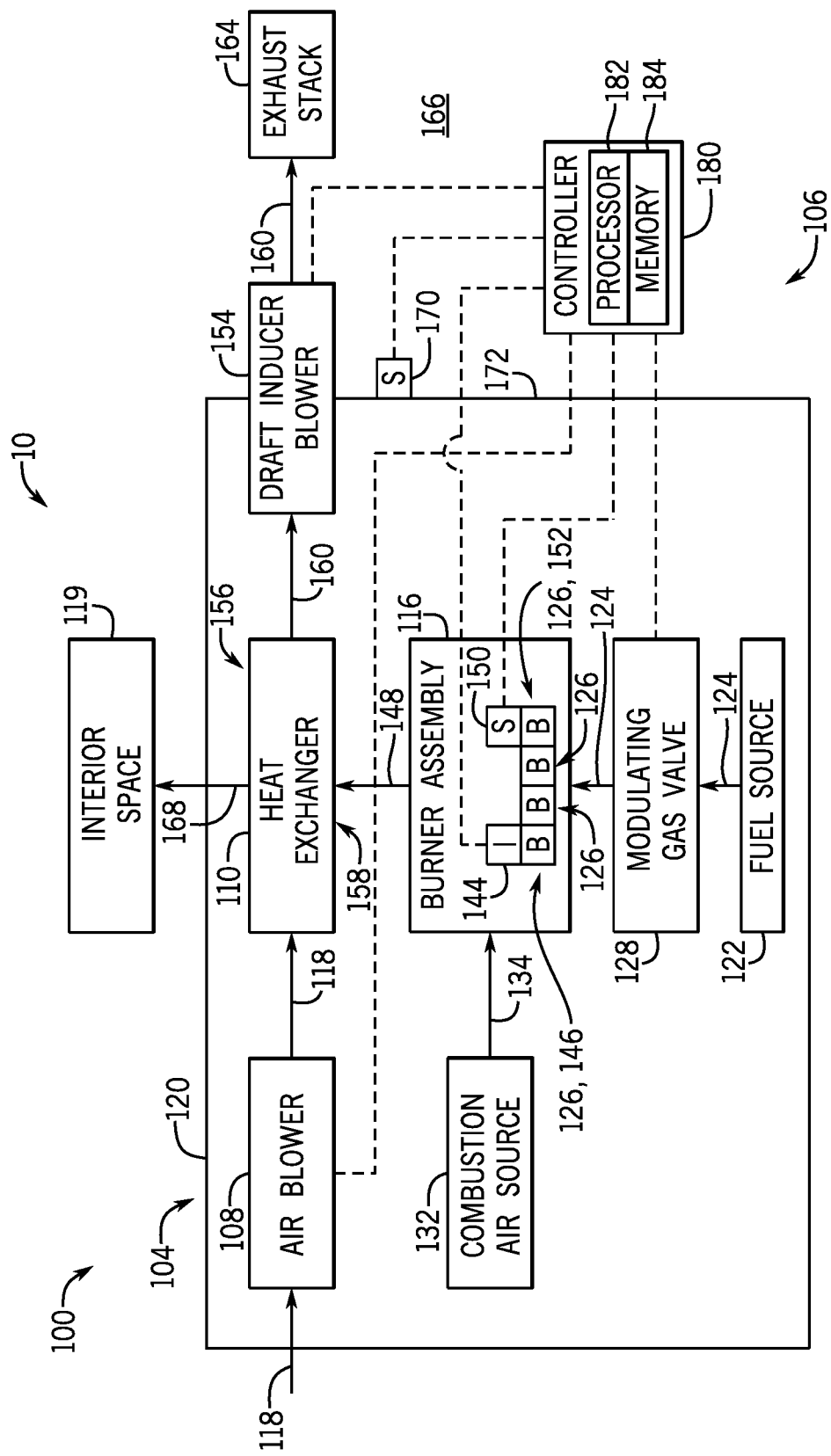
FIG. 5 is a schematic diagram of an embodiment of a modulating furnace configured to provide improved conditioning for a conditioned space, in accordance with an aspect of the present disclosure.

FIG. 5 is a schematic diagram of an embodiment of an HVAC system 100 including a modulating furnace 104 and a furnace control system 106 operatively coupled to the modulating furnace 104. The modulating furnace 104 and/or furnace control system 106 may implemented in any of the systems or units illustrated in FIGS. 1-4. The furnace control system 106 is configured to regulate operation of components of the modulating furnace 104 to generate a conditioned (e.g., heated) air flow to be supplied to an interior space 119 (e.g., a space within the building 10). The modulating furnace 104 includes an air blower 108, a heat exchanger 110, and a burner assembly 116 that operate to heat air 118 received by the modulating furnace 104 before directing the air towards the interior space 119. As illustrated, one or more components of the modulating furnace 104 may be disposed within an enclosure 120 that receives the air 118 and directs the air 118 across and/or over the heat exchanger 110. However, in some embodiments, the heat exchanger 110, the burner assembly 116, and other components of the modulating furnace 104 may be housed in separate enclosures, separate portions of the enclosure 120, or in a shared portion of the enclosure 120. Moreover, although schematically illustrated in FIG. 5 as having one heat exchanger 110, any suitable number of heat exchangers, including primary and secondary heat exchangers of a condensing furnace system, may be used within the modulating furnace 104 for transferring heat to the air 118.

As shown, the modulating furnace 104 includes a fuel source 122 to provide a fuel 124 to burners 126 of the burner assembly 116. The fuel 124 may include natural gas, liquified petroleum gas, fuel oil, coal, or another suitable fuel. The burners 126 ignite the fuel 124 to generate thermal energy (e.g., combustion products, exhaust gas, etc.) for transfer to the air 118 via the heat exchanger 110, as discussed in more detail below. The burners 126 may include any suitable body, nozzle, or tube having an inlet for receiving the fuel 124 and an outlet for directing the fuel 124 therefrom. As illustrated, a modulating gas valve 128 or gas regulation device is fluidly coupled between the fuel source 122 and the burner assembly 116 to regulate a fuel input rate of the fuel 124 provided to the burners 126 of the burner assembly 116. Although described herein with reference to the modulating gas valve 128, it is to be understood that the modulating furnace 104 may additionally or alternatively include any suitable gas regulation device or system, such as a pressure regulator, configured to regulate flow of the fuel 124. Additionally, in some embodiments, an oxidant or combustion air source 132 may provide combustion air 134 or some other oxidant to the burners 126 of the burner assembly 116. For example, the combustion air 134 may be drawn into each individual burner 126 of the burner assembly 116 to mix with the fuel 124 drawn into each individual burner 126 of the burner assembly 116. In some embodiments, the combustion air source 132 may be an area within the burner assembly 116 external to the individual burners 126 of the burner assembly 116.

The combustion air 134 may mix with the fuel 124 in the burners 126 and/or adjacent to the burners 126 to form a combustible mixture, which may be referred to herein as an air-fuel mixture. The air-fuel mixture may be ignited via an igniter 144 coupled to the burner assembly 116. For example, a pulse (e.g., control signal) may be sent through the igniter 144 to instruct the igniter 144 to produce a spark adjacent or within the burners 126 of the burner assembly 116. In some embodiments, the air-fuel mixture is ignited in one ignitable burner 146 proximate the igniter 144, which sequentially ignites the air-fuel mixture in adjacent burners 126. In other embodiments, the air-fuel mixture may be ignited by other components or elements, such as hot surface igniter or a pilot light flame. In the illustrated embodiment, once ignited, the air-fuel mixture drawn through the burners 126 of the burner assembly 116 may form combustion products, such as a hot exhaust gas 148. The furnace control system 106 may control operation of the components of the modulating furnace 104 to maintain robust flames, such as flames extending outside of bodies of the burners 126. In this way, the burner assembly 116 may produce the hot exhaust gas 148 at a desired temperature, composition, and/or efficiency. The hot exhaust gas 148 may be directed through the heat exchanger 110 (e.g., through tubes of the heat exchanger 110) to enable heat transfer from the hot exhaust gas 148 to the air 118.

Further, the furnace control system 106 may include a flame sensor 150 coupled to the burner assembly 116 to sense or detect a presence of a flame on a sensed burner 152, opposed from the ignitable burner 146 (e.g., relative to other burners 126 of the burner assembly 116). As such, the flame sensor 150 enables the furnace control system 106 to verify whether the air-fuel mixture within each of the burners 126 has been ignited.

The modulating furnace 104 may also include a draft inducer blower 154 fluidly coupled to a distal portion 156 of the heat exchanger 110 (e.g., heat exchange tubes), opposite a proximal portion 158 of the heat exchanger 110 that is proximate the burner assembly 116. In certain embodiments, the combustion air 134 may be drawn into the burners 126 of the burner assembly 116 at least partially due to a pressure difference generated by the draft inducer blower 154, which may also operate to draw the hot exhaust gas 148 through the heat exchanger 110. In other words, a flow path for the combustion air 134 and the hot exhaust gas 148 extends from the burners 126 of the burner assembly 116 to the draft inducer blower 154. Thus, the draft inducer blower 154 may operate to draw both the combustion air 134 into the burners 126 of the burner assembly 116 and the hot exhaust gas 148 through the flow path between the draft inducer blower 154 and the burner assembly 116. Additionally, as the draft inducer blower 154 draws the hot exhaust gas 148 through the heat exchanger 110, the hot exhaust gas 148 may cool into exhaust gas 160, which the draft inducer blower 154 may direct into an exhaust stack 164 of the modulating furnace 104. The exhaust stack 164 may discharge the exhaust gas 160 from the modulating furnace 104 into an external environment 166 external to the modulating furnace 104.

Moreover, during operation of the modulating furnace 104, as the hot exhaust gas 148 is drawn through the heat exchanger 110, the air blower 108 draws the air 118 into the enclosure 120 of the modulating furnace 104. The air 118 is directed across coils or tubes of the heat exchanger 110 to enable transfer thermal energy from the hot exhaust gas 148 flowing therein to the air 118, thereby generating heated air 168. Then, the heated air 168 is discharged from the enclosure 120 and directed toward the interior space 119. For example, the modulating furnace 104 and/or HVAC system 100 may direct the heated air 168 into an air distribution system of the building 10, such as the ducts 14 of FIG. 1.

Further, in some embodiments, such as embodiments in which the enclosure 120 of the modulating furnace 104 is configured to be disposed outside of the building 10, the furnace control system 106 may include a wind sensor 170 disposed within the external environment 166 (e.g., coupled to an external surface 172 of the enclosure 120). The wind sensor 170 may be a pressure switch or any other suitable sensor configured to monitor a presence of a wind condition and/or a wind speed and transmit sensor signals indicative of the wind condition and/or the wind speed to the furnace control system 106. As such, the furnace control system 106 may adjust control parameters based on detection of the wind condition.

Additionally, the modulating furnace 104 may be a variable speed furnace system configured to adjust an amount and/or rate of heat produced and transferred to the air 118 to generate the heated air 168 provided to the building 10. For example, based on a heat demand of the interior space 119 of the building 10, the modulating furnace 104 may adjust a fuel input rate of the fuel 124 provided to the burners 126 to modify the heat generated via the hot exhaust gas 148. Additionally or alternatively, in some embodiments, the draft inducer blower 154 may be controlled to modify the flow rate of the hot exhaust gas 148 drawn through the heat exchanger 110 to thereby control rate of heat transfer from the hot exhaust gas 148 to the air 118. In some embodiments, the modulating furnace 104 may alternatively be a two stage or multiple stage furnace system configured to operate at two or more different heat output levels or capacities, such as a low heat output level and a high heat output level.

The furnace control system 106 may further include a controller 180 (e.g., control circuitry) configured to control the modulating furnace 104 by transmitting control signals to various components therein. The controller 180 may include a processor 182 and a memory 184 (e.g., non-transitory, computer-readable media having instructions stored thereon. The memory 184 may include instructions stored thereon that, when executed by the processor 182, cause the controller 180 to perform various functions (e.g., execute a quick heat algorithm in accordance with the present disclosure). For example, the controller 180 may be communicatively coupled to the modulating gas valve 128 and the draft inducer blower 154. As such, the controller 180 may instruct the modulating gas valve 128 to adjust a fuel input rate of the fuel 124 provided to the burner assembly 116, thereby adjusting a temperature of the hot exhaust gas 148 produced by the burner assembly 116. For example, increasing the fuel input rate of fuel 124 directed into the burner assembly 116 may increase the temperature of the hot exhaust gas 148 and increase the temperature of the heated air 168.

Additionally, the controller 180 may instruct the draft inducer blower 154 to generate an increased flow rate of hot exhaust gas 148 through the heat exchanger 110. For example, the controller 180 may instruct the draft inducer blower 154 to increase the flow rate of hot exhaust gas 148 in conjunction with instructing the modulating gas valve 128 to increase a fuel input rate of the fuel 124. Increasing the fuel input rate of fuel 124 supplied to the burner assembly 116 and/or and increasing the speed of the draft inducer blower 154 may be referred to as "ramping up" the modulating furnace 104 to increase an amount of heat transferred to the air 118 and provided to the interior space 119 of the building 10 via the heated air 168. Conversely, decreasing the fuel input rate and decreasing the speed of the draft inducer blower 154 may be referred to as "ramping down" the modulating furnace 104 to reduce an amount of heat transferred to the air 118 and provided to the interior space 119 of the building 10 via the heated air 168. Further, in some embodiments, the controller 180 is communicatively coupled to the air blower 108 and is configured to transmit control signals to cause the air blower 108 to modify a flow rate of the air 118 across coils or tubes of the heat exchanger 110. In this way, the modulating furnace 104 may adjust an amount of time the air 118 is in contact with the heat exchanger 110, for example, while ramping up or ramping down the modulating furnace 104.

Figures 6, 7:
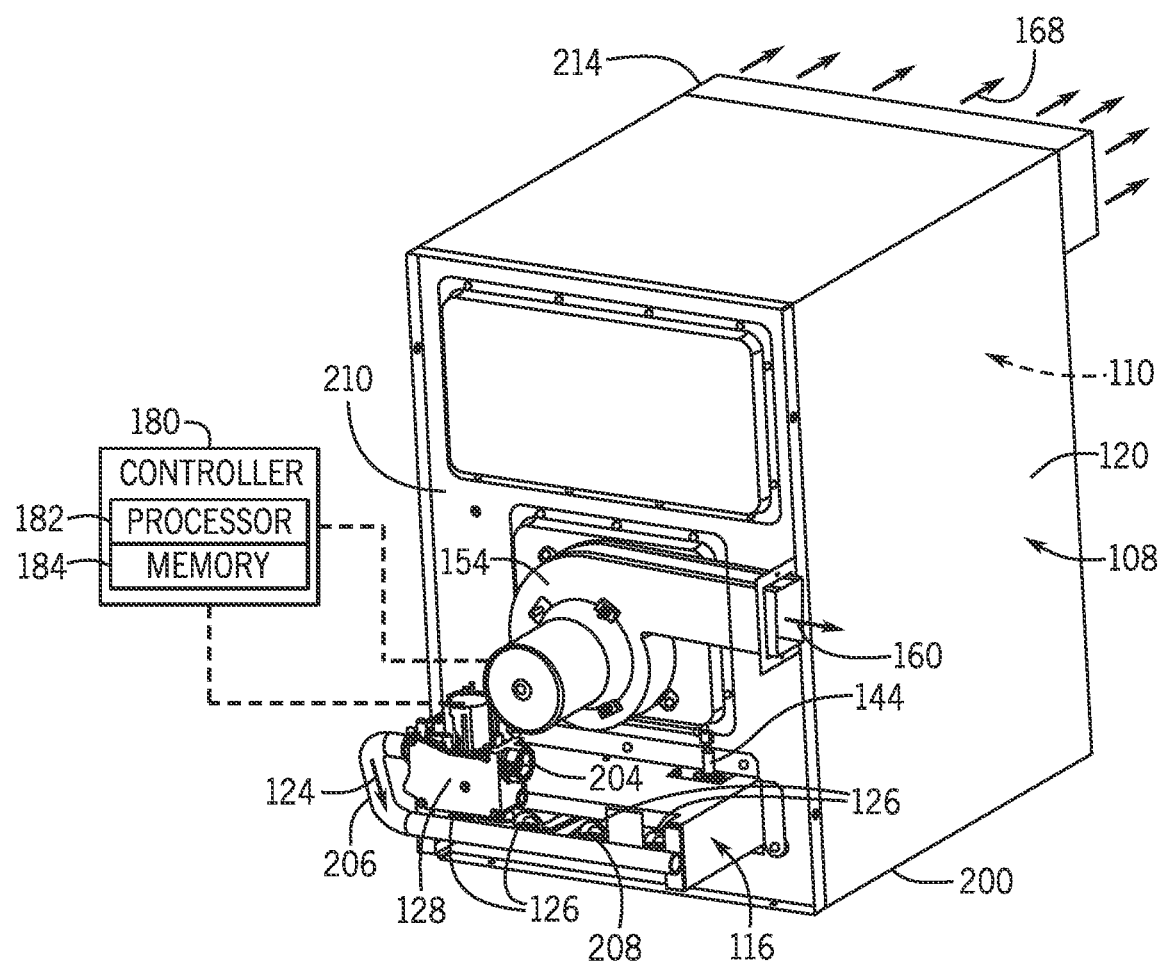
FIG. 6 is a perspective view of an embodiment of a modulating furnace configured to provide improved conditioning for a conditioned space, in accordance with an aspect of the present disclosure.
FIG. 7 is a schematic diagram of an embodiment of a control system for a modulating furnace, in accordance with an aspect of the present disclosure.

FIG. 6 is a perspective view of an embodiment of the modulating furnace 104. In the illustrated embodiment, the burner assembly 116 is located near a base 200 (e.g., a base surface) of the modulating furnace 104, and the burner assembly 116 includes multiple burners 126. As previously described, each burner 126 is configured to combust a mixture of combustion air 134 and fuel 124. The combustion air 134 may be drawn into each burner 126 at least partially due to a pressure difference generated by the draft inducer blower 154 and/or at least partially due to air entrainment within a jet or stream of fuel 124 provided to each burner 126 of the burner assembly 116. The fuel 124 may be provided from the fuel source 122 to a gas inlet 204 of the modulating gas valve 128. The modulating gas valve 128 is fluidly coupled to a manifold 206, which distributes the fuel 124 to a body 208 of each burner 126. In some embodiments, the fuel 124 may be evenly or substantially evenly distributed via the manifold 206 to each burner 126. As such, the modulating gas valve 128 may control a fuel input rate to the burners 126. In this way, the modulating gas valve 128 controls a quantity or volume of the fuel 124 in the mixture of each burner 126.

Moreover, the draft inducer blower 154 is disposed on (e.g., mounted and/or attached to) an outer surface 210 of the enclosure 120 of the modulating furnace 104. As previously described, the draft inducer blower 154 draws the hot exhaust gas 148 produced at the burners 126 through the heat exchanger 110 (e.g., tubes of the heat exchanger 110) within the enclosure 120. Additionally, the air blower 108 may be disposed within the enclosure 120, for example, near the base 200 of the enclosure 120. However, in other embodiments, the air blower 108 may be disposed external to the enclosure 120. During operation of the modulating furnace 104, the air blower 108 forces or draws the air 118 over tubes of the heat exchanger 110, and heat is transferred from the hot exhaust gas 148 to the air 118. Thereafter, the heated air 168 may be discharged from the enclosure 120 and into a duct 214, which may direct the heated air 168 toward the interior space 119. As discussed above, the exhaust gas 160 may be drawn from the tubes of the heat exchanger 110 and directed into the exhaust stack 164.

As discussed above, the controller 180 is communicatively coupled to the modulating gas valve 128 and the draft inducer blower 154 and is configured to adjust operation of the modulating gas valve 128 and/or the draft inducer blower 154. In accordance with present techniques, the controller 180 of the modulating furnace 104 is further configured to control operation of the various above-described components of the modulating furnace 104 in multiple, different operating modes. For example, the memory 184 may include instructions stored thereon that, when executed by the processor 182, cause the controller 180 to control operation of the various components of the modulating furnace 104. The controller 180 may be disposed inside a housing (e.g., enclosure 120) of the modulating furnace 104, may be disposed on a housing (e.g., on an external surface of the housing), or in another location separate from the modulating furnace 104. For example, the controller 180 may be the control panel 82, another controller of the HVAC system 100, a controller of the HVAC unit 12, a controller of the heating and cooling system 50, or other controller. In accordance with present embodiments, the controller 180 may be configured to execute a quick heat cycle algorithm to determine whether, when, and how long to initiate a quick heat cycle mode of the modulating furnace 104. Based on the determination, the controller 180 may then execute the quick heat cycle mode accordingly.

For example, in the quick heat operating mode, the controller 180 may control the modulating furnace 104 (e.g., the burner assembly 116, the modulating gas valve 128) to direct fuel 124 (e.g., gas) to the burners 126 at an upper threshold (e.g., maximum) flow rate. In some embodiments, the controller 180 may control the burner assembly 116 to operate at an upper threshold (e.g., maximum) firing rate of the burners 126. Additionally or alternatively, during the quick heat operating mode, the controller 190 may control the draft inducer blower 154 to draw the exhaust gas 160 through the heat exchanger 110 at an upper threshold (e.g., maximum) flow rate at which the draft inducer blower 154 is configured to designed to operate. In other words, in the quick heat operating mode, the controller 180 may control the modulating furnace 104 to operate at a full, 100 percent, upper threshold, predefined maximum, and/or maximum capacity (e.g., heat output, heat transfer rate, etc.)

The controller 180 may also be configured to operate the modulating furnace 104 in a modulating heat operating mode in which the controller 180 controls the modulating furnace 104 (e.g., the burner assembly 116, the modulating gas valve 128) to supply a varying amount of fuel 124 (e.g., gas). For example, in the modulating heat operating mode, the controller 180 may instruct the modulating gas valve 128 to supply fuel 124 to the burners 126 based on feedback (e.g., sensor feedback). In some embodiments, the controller 180 may receive feedback including a set point temperature in the interior space 119 (e.g., from a thermostat) and a measured (e.g., current) temperature of the interior space 119 (e.g., from a sensor (e.g., interior space 119 sensor, return air sensor, etc.). The controller 180 may determine a temperature difference between the set point temperature and the measured temperature and instruct the modulating gas valve 128 to supply fuel 124 to the burners 126 based on the temperature difference. Additionally or alternatively, during the modulating heat operating mode, the controller 190 may control the draft inducer blower 154 (e.g., based on the temperature difference, sensor feedback, etc.) to operate at one or more speeds to draw the exhaust gas 160 through the heat exchanger 110 at a desired (e.g., variable) flow rate. The controller 180 may control a setting of the modulating gas valve 128 and/or the draft inducer blower 154 to correspond to the quick heat operating mode or the modulating heat operating mode. For example, the controller 180 may control a position of the modulating gas valve 128 to direct the above-described upper threshold amount of fuel 124 (e.g., an amount of fuel 124 provided at a maximum rate) to the burners 126 in response to initiation of the quick heat operating mode. The controller 180 may also control the position of the modulating gas valve 128 to direct a varying amount of fuel 124 to the burners 126 in response to initiation of the modulating heat operating mode. The controller 180 may similarly control a speed of the draft inducer blower 154 based on initiation of the quick heat operating mode and initiation of the modulating heat operating mode.

As previously described, the controller 180 may determine whether and when to initiate quick heat cycle operation based on a quick heat algorithm executed by the controller 180 and/or by another controller (e.g., control panel 82, a thermostat, etc.). In some embodiments, the quick heat algorithm may consider or analyze characteristics or parameters of recent cycles of the modulating furnace 104. In accordance with the present disclosure, the term "cycle" or "furnace cycle" may refer to a time period beginning when operation of the modulating furnace 104 is initiated in response to a call for heating and ending when the call for conditioning is satisfied (e.g., operation of the modulating furnace 104 is suspended). In accordance with the present disclosure, the term "elapsed time" may refer to a time period beginning when operation of the modulating furnace 104 is initiated in response to a call for heating.

FIG. 7 is a schematic illustration of an embodiment of a control system 220 for the modulating furnace 104. It should be appreciated that the control system 220 may also be implemented, in accordance with the present techniques, with other modulating conditioning (e.g., heating, cooling, dehumidification, etc.) systems as previously described. In the illustrated embodiment, the control assembly 220 includes the controller 180, which includes the processor 182 (e.g., one or more processors, processing circuitry, etc.), the memory 184 (e.g., non-transitory, computer-readable media having processor-executable instructions stored thereon), and communication circuitry 186. The control system 220 further includes a thermostat 222, which includes a user interface 224. For example, the thermostat 222 may be a thermostat of the interior space 119. It should be noted that the thermostat 222 may be a wall-mounted device or a handheld device such as a smart phone or some other network-connected device. In general, the thermostat 222 may be configured to receive an input (e.g., via the user interface 224 of the thermostat 222, which may include buttons, a display, a graphic user interface [GUI], or any combination thereof) that sets a desired temperature of the conditioned space, referred to in certain instances as a set-point. Further, in some embodiments, the user interface 224 may be a component separate from the thermostat 222. For example, the user interface 224 may be a mobile device, a tablet, a computer, or other apparatus configured to receive user input. In such embodiments, the user interface 224 may be communicatively coupled to the thermostat 222, the controller 180, and/or other component of the HVAC system 100. For example, the controller 180 may be communicatively coupled with the thermostat 222 and configured to receive a call from the thermostat 222. For example, the user interface of the thermostat 222 may receive an input indicative of operation of the modulating furnace 104 in the quick heat operating mode. The control system 220 also includes a sensor 226 (e.g., one or more sensors), such as a temperature sensor disposed within the interior space 119, a return air sensor of the HVAC system 100 (e.g., HVAC unit 12, heating and cooling system 50), and/or other sensors. The memory 184 may include instructions stored thereon that, when executed by the processor 182, cause the controller 180 to perform various functions (e.g., execute a quick heat algorithm in accordance with the present disclosure). The controller 180, the thermostat 222, the user interface 224, and/or the sensor 226 may be communicatively coupled via a wired and/or wireless arrangement (e.g., via a network system 228, such as an Internet, Wi-Fi, or Bluetooth system). While the controller 180 is described as a component of the modulating furnace 104, any suitable control circuitry may be utilized to control operation of the modulating furnace 104. For example, a mobile device, a personal computer, a smart device, a laptop, a tablet, or any other suitable device may be utilized to control operation of the modulating furnace 104 and/or execute the quick heat algorithm, as described herein.

As previously described, the controller 180 may receive a call for conditioning (e.g., heating). For example, the controller 180 may receive the call for conditioning from the thermostat 222 (e.g., via the user interface 224, which may include one or more buttons, displays, graphic user interfaces [GUIs], dials, touchscreens, or any combination thereof) and/or from the control panel 82. In response to receiving the call, the controller 180 may execute a quick heat algorithm to initiate operation of the modulating furnace 104. In some instances and as described further below, execution of the quick heat algorithm may cause the controller 180 to operate the modulating furnace 104 in the quick heat operating mode, in the manner previously described, for a threshold time period. If the call for conditioning is not satisfied prior to expiration of the threshold time period, the controller 180 may then operate the modulating furnace 104 in the modulating heat operating mode until the call is satisfied. For example, the controller 180 may operate the modulating furnace 104 in the modulating heat operating mode subsequent to expiration of the threshold time period. Additionally or alternatively, the controller 180 may include a timer (e.g., a clock) configured to count an elapsed time from the call (e.g., receiving the call, initiating operation of the modulating furnace 104). In certain embodiments, the controller 180 may compare the elapsed time from the timer to the threshold time period and/or may operate the modulating furnace 104 in the modulating heat operating mode subsequent to expiration of the threshold time period. In some embodiments, the timer may count down from the threshold time period and the controller 180 may operate the modulating furnace 104 in the modulating heat operating mode subsequent to expiration of the threshold time period on the timer.

In the quick heat algorithm employed by the controller 180, each previously satisfied call from the thermostat may be associated with a cycle of the modulating furnace that was used to satisfy the call. The quick heat algorithm employed to initiate operation of the modulating furnace 104 may be based at least in part on recent (e.g., previous) cycles of the modulating furnace 104, whether the recent cycles, which satisfied previous calls from the thermostat 222, employed quick heat cycle operation, an elapsed time of the current cycle, and comparing the elapsed time to a threshold time period. A modulating heat cycle refers to a cycle that was completed without initiating quick heat operation. A quick heat cycle refers to a cycle that was completed only after initiation of quick heat cycle operation (e.g., quick heat cycles may include quick heat cycle operation and then include modulating heat cycle operation to satisfy the call from the thermostat 222).

The quick heat algorithm may include a comparison of the number of consecutive recent cycles which are modulating heat cycles and a threshold number of cycles. Thus, the controller 180 may compare a number of consecutive recent modulating heat cycles with a threshold number of cycles. If the number of consecutive recent modulating heat cycles meets or exceeds the threshold number of cycles, the controller 180 may initiate operation of the modulating furnace 104 in the quick heat operating mode. Likewise, if the number of consecutive recent modulating heat cycles fails to meet or exceed the threshold number of cycles, the controller 180 may initiate operation of the modulating furnace 104 in the modulating heat operating mode. For example, if the threshold number of cycles is five cycles, the modulating furnace 104 is controlled to operate in the modulating heat operating mode for at most five consecutive heating cycles, then the modulating furnace 104 is controlled to operate in the quick heat operating mode for the next cycle after the five consecutive modulating heat cycles.

Additionally, the controller 180 may also compare the elapsed time compared to a threshold time period and the comparison may be employed via the quick heat algorithm. The quick heat algorithm may include a comparison of the elapsed time for the current cycle and the threshold time period. Thus, if the elapsed time meets or exceeds the threshold time period, the controller 180 may operate the modulating furnace 104 in the modulating heat operating mode. In certain embodiments, the controller 180 may continue to operate the modulating furnace 104 in the quick heat operating mode until either of the call from the thermostat 222 is satisfied or the elapsed time meets or exceeds the threshold time period.

In one embodiment, the thermostat 222 may call for a temperature increase (e.g., a difference between the desired temperature (e.g., set temperature) and a current temperature of the conditioned space) of a certain number of degrees (e.g., Fahrenheit, Celsius) in the enclosed space serviced by the modulating furnace 104. The call may be in the form of a value indicative of a desired temperature differential, a value indicative of a desired temperature, a first value indicative of a desired temperature and a second value indicative of a current temperature, or the like. The controller 180 may receive the call from the thermostat 222 and, in response to the call, execute the quick heat algorithm to initiate operation of the modulating furnace for an elapsed time (e.g., an amount of time during which quick heat cycle operation is employed and after which modulating heat cycle operation is initiated if the call is not satisfied prior to the elapsed time meeting or exceeding a threshold time period). For example, if the threshold time period is 8 minutes, the modulating furnace 104 is controlled to operate in the quick heat operating mode for at most 8 minutes, and if the call from the thermostat 222 is not satisfied by the quick heat operating mode before or by the time the 8 minutes expire, then the modulating furnace 104 is controlled to operate in the modulating heat operating mode until the call from the thermostat 222 is satisfied.

Additionally or alternatively, the user interface of the thermostat 222 may receive an input indicative of setting and/or adjusting a threshold number of consecutive modulating heat cycles and/or a threshold time period to operate the modulating furnace 104 in the quick heat operating mode. For example, the user interface may receive an input to increase the threshold time period (e.g., up to 4 minutes, 6 minutes, 8 minutes, 10 minutes, 15 minutes, and so forth) and/or may receive an input to decrease the threshold time period (e.g., to 10 minutes, 8 minutes, 4 minutes, and so forth).

As mentioned above, the sensor 226 may be a temperature sensor configured to detect a temperature in the space (e.g., interior space 119) being conditioned by the modulating furnace 104. In certain embodiments, the sensor 226 may detect a temperature of return air (e.g., received by the HVAC system 100). When the temperature detected by the sensor 226 indicates that the call from the thermostat 222 is satisfied (e.g., a set point temperature is reached), the controller 180 may suspend operation of the modulating furnace 104. That is, the controller 190 may control the modulating furnace 104 to end the cycle (e.g., until another call for heating is received by the controller 180). Additionally or alternatively, the controller 180 may control the modulating furnace 104 in the modulating heat cycle based on feedback (e.g., indicative of the measured temperature of the conditioned space) from the sensor 226. In certain embodiments, the controller 180 may determine a temperature difference between the temperature of the conditioned space (e.g., interior space 119) monitored by the sensor 226 and a set point temperature (e.g., input via the thermostat 222 and/or interface 224). The controller 180 may operate the modulating furnace 104 in the modulating heat cycle operation mode based on the temperature difference. For example, the controller 180 may adjust the modulating gas valve 128 to control a flow rate of the fuel 124 supplied to the burners 126 of the modulating furnace 104 based on the temperature difference. In some embodiments, the controller 180 may adjust the modulating gas valve 128 to decrease the fuel 124 flow rate as the temperature difference decreases (e.g., the temperature of the interior space 119 approaches the set point temperature). The controller 180 may adjust the modulating gas valve 128 to increase the fuel 124 flow rate as the temperature difference increases (e.g., the temperature of the interior space 119 diverges from the set point temperature). In the modulating heat cycle operation, the controller 180 may additionally or alternatively control the draft inducer blower 154 similarly.

The quick heat algorithm employs additional features described in detail below with reference to later drawings. However, in general, a result (e.g., output or outcome) of the quick heat algorithm may be at least in part a function of the above-described elapsed time, threshold time period, and a number of cycles from the last quick heat cycle. The output or outcome includes initiation of the modulating furnace 104 during which the controller 180 operates the modulating furnace 104 in the quick heat operating mode and, if the call from the thermostat 222 is not satisfied prior to the threshold time period expiring or lapsing, after which the controller 180 operates the modulating furnace 104 in the modulating heat operating mode. These and other features are described in detail below with reference to later drawings.

Figure 8:
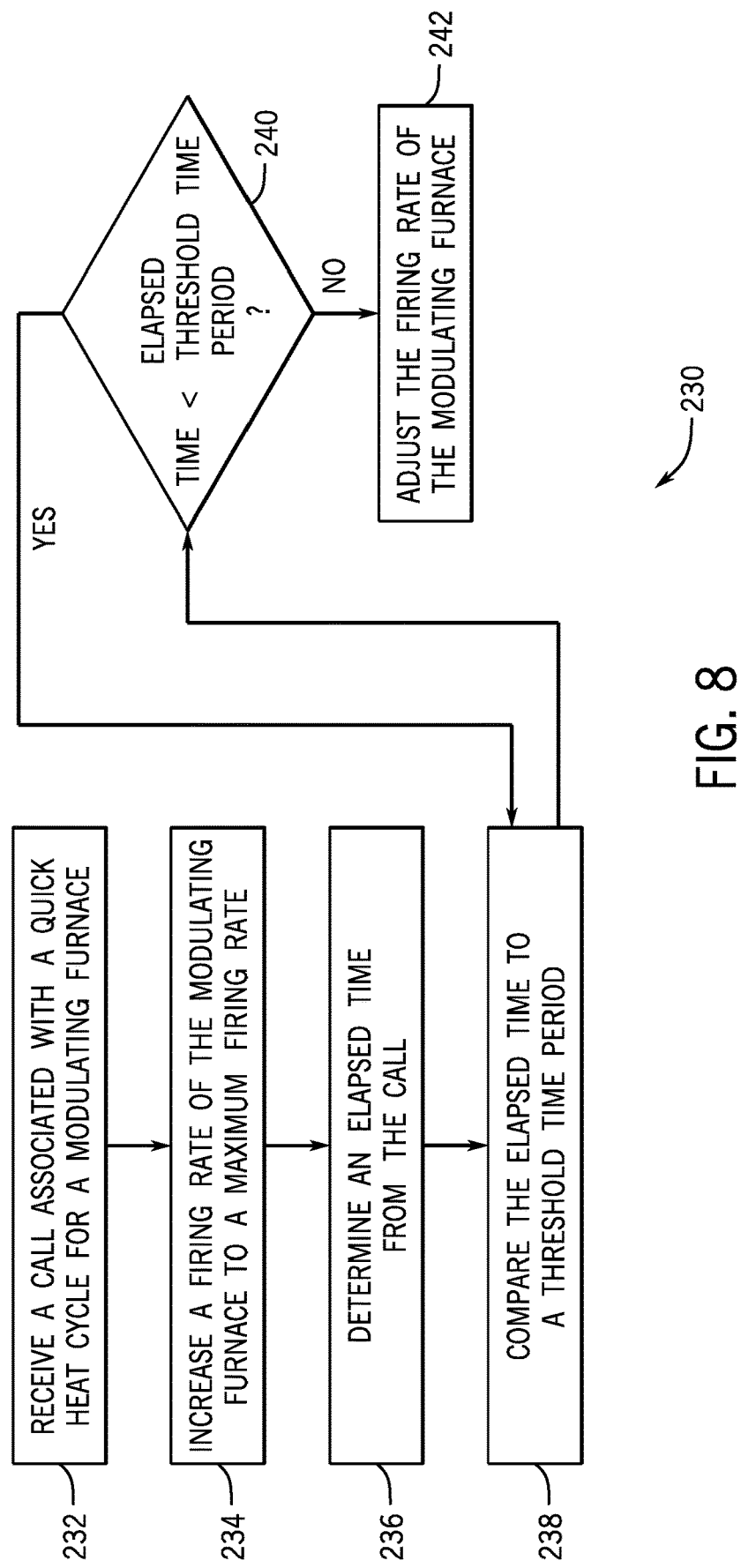
FIG. 8 is a process flow diagram illustrating an embodiment of a method of executing a quick heat algorithm of a modulating furnace, in accordance with an aspect of the present disclosure.

With the foregoing in mind, FIG. 8 is an embodiment of a process flow diagram illustrating a process 230 of executing a quick heat algorithm. In the illustrated embodiment, the process 230 includes receiving (block 232) a call for heating from a thermostat, such as the thermostat 222. The controller 180 may receive the call and may associate (block 234) the call with a quick heat cycle for the modulating furnace 104. For example, the call may be indicative of a user selection of a quick heat cycle via the user interface, such as user interface 224 of the thermostat 222. Accordingly, the controller 180 may associate the call with the quick heat cycle. Additionally or alternatively, the controller 180 may associate the call with the quick heat cycle based on a comparison between the number of consecutive modulating heat cycles and a threshold number of cycles, as described herein.

The illustrated process 230 also includes operating (block 236) the modulating furnace 104 in a quick heat operating mode. In certain embodiments, in response to receiving the call and/or associating the call with the quick heat cycle, the controller 180 may initiate operation of the modulating furnace 104. For example, the controller 180 may operate the modulating furnace 104 in the quick heat operating mode, as described herein. In certain embodiments, the controller 180 may adjust the modulating gas valve 128 to increase a fuel flow rate of a fuel 124 to a threshold (e.g., maximum) flow rate during the quick heat operating mode. Additionally or alternatively, the controller 180 may adjust the draft inducer blower 154 to produce a threshold (e.g., maximum) flow rate of combustion products (e.g., exhaust gas 160) through the heat exchanger 110.

The illustrated process 230 also includes determining (block 238) an elapsed time for the current heating cycle. For example, the elapsed time may be a time period beginning when operation of the modulating furnace 104 is initiated in response to the thermostat call. The illustrated process 230 also includes comparing (block 240) the elapsed time to a threshold time period. The threshold time period may be stored in the memory 184 of the controller 180. The controller 180 may determine (block 242) whether the elapsed time falls below or meets or exceeds the threshold time period. For example, the controller 180 may determine the elapsed time is 2 minutes and the threshold time period is 4 minutes. As such, the controller 180 may compare the elapsed time to the threshold time period and determine the elapsed time falls below the threshold time period (YES path of block 242). Accordingly, the controller 180 may continue to operate the modulating furnace 104 in the quick heat operating mode until the threshold time period expires (e.g., the elapsed time meets or exceeds the threshold time period).

As another example, the elapsed time may be 6 minutes and the threshold time period may also be 6 minutes. As such, the controller 180 may compare the elapsed time to the threshold time period and determine the elapsed time meets (or exceeds) the threshold time period (NO path of block 242). Accordingly, the controller 180 may operate (block 244) the modulating furnace 104 in the modulating heat operating mode, as described herein. For example, the controller 180 may adjust operation of the modulating furnace 104 from the quick heat operating mode to the modulating heat operating mode subsequent to the expiration of the threshold time period. In certain embodiments, the controller 180 may adjust the modulating gas valve 128 to decrease the fuel flow rate from the threshold (e.g., maximum) flow rate to a lower flow rate. Additionally or alternatively, the controller 180 may adjust the draft inducer blower 154 to produce a flow rate of combustion products (e.g., exhaust gas 160) through the heat exchanger 110 that is lower than the threshold (e.g., maximum) flow rate.

Figure 9:
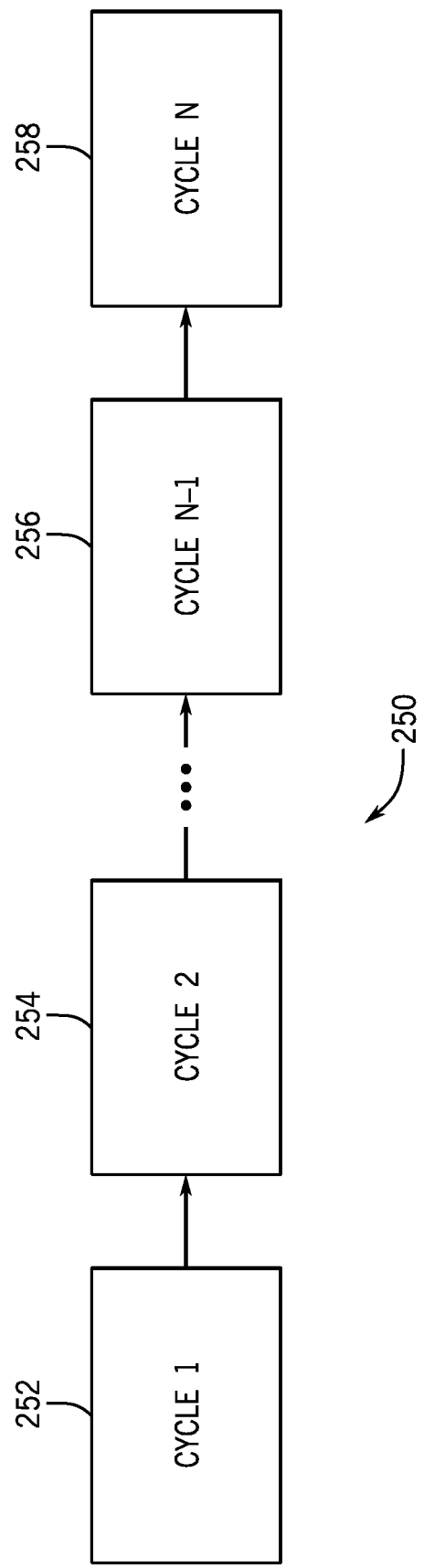
FIG. 9 is a block diagram of an embodiment of a sequence of cycles for a modulating furnace, in accordance with an aspect of the present disclosure.

FIG. 9 is a block diagram of a sequence 250 of cycles for the modulating furnace of FIG. 5, in accordance with an embodiment of the present disclosure. The sequence 250 may include any number of cycles, such as first cycle 252, second cycle 254, N−1th cycle 256, and Nth cycle 258. In certain embodiments, N may be any number and may be a threshold number of modulating heat cycles before the controller 180 operates the modulating furnace 104 in a quick heat operating mode. Any number of cycles may occur between the illustrated second cycle 254 and the N−1th cycle 256. For example, N may be 7 cycles and the N−1th cycle 256 may be the sixth cycle in the sequence 250. In certain embodiments, the controller 180 may monitor the sequence of cycles to determine a number of consecutive modulating heat cycles. For example, the controller 180 may receive a call from the thermostat 222 for each cycle 252, 254, 256, 258. In some embodiments, the first cycle 252, the second cycle 254, and the N−1th cycle 256 may be modulating heat cycles. For example, the controller 180 may operate the modulating furnace 104 in the modulating heat operating mode for the first cycle 252, the second cycle 254, the N−1th cycle 256, and any number of cycles between the second cycle 254 and the N−1th cycle. In certain embodiments, the controller 180 may compare the number of consecutive modulating heat cycles with a threshold number of cycles. For example, the controller 180 may receive a call from the thermostat 222 for heating. In response to the call, the controller 180 may determine the number of consecutive modulating heat cycles from previous calls for heating. Additionally or alternatively, the controller 180 may determine the number of cycles from the current call for heating and a previous call during which the modulating furnace 104 was operated in the quick heat operating mode.

The controller 180 may compare the number of consecutive modulating heat cycles to the threshold number of cycles and may operate the modulating furnace 104 in either a modulating heat operating mode or a quick heat operating mode based on the comparison. For example, if the number of consecutive modulating heat cycles meets or exceeds the threshold number of cycles, then the controller 180 may operate the modulating furnace 104 in the quick heat operating mode in response to the call for heating from the thermostat 222. As such, the Nth cycle 258 may be a quick heat cycle of the modulating furnace 104. Alternatively, if the number of consecutive modulating heat cycles falls below the threshold number of cycles, then the controller 180 may operate the modulating furnace 104 in the modulating heat operating mode in response to the call for heating from the thermostat 222. Accordingly, the Nth cycle 258 may be a modulating heat cycle of the modulating furnace 104.

Figure 10:
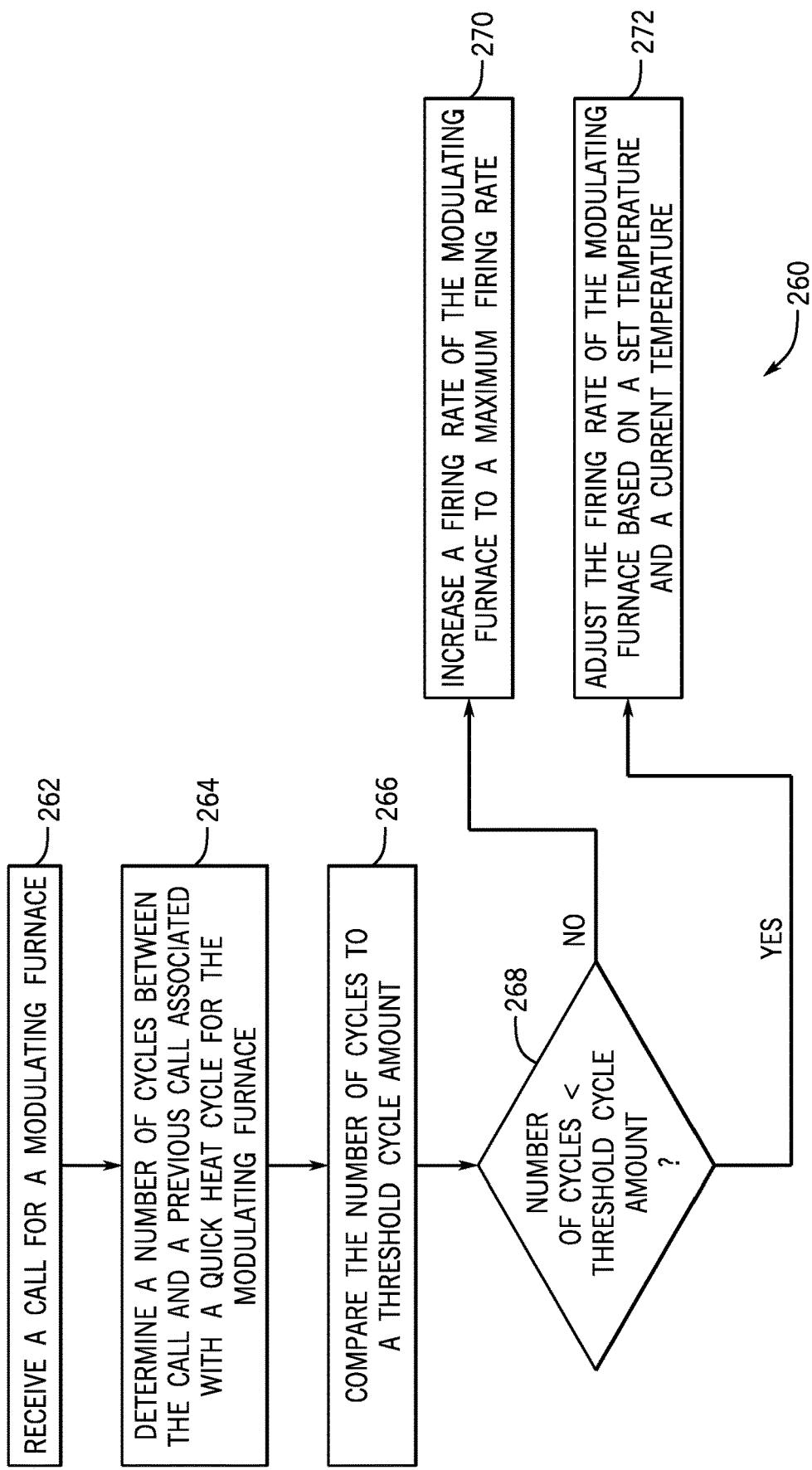
FIG. 10 is a process flow diagram illustrating an embodiment of a method of executing a quick heat algorithm of a modulating furnace based on a number of completed cycles, in accordance with an aspect of the present disclosure.

With the foregoing in mind, FIG. 10 is an embodiment of a process flow diagram illustrating a process 260 of executing the quick heat algorithm. In the illustrated embodiment, the process 260 includes receiving (block 262) a call for heating from a thermostat, such as the thermostat 222. In certain embodiments, the controller 180 may receive the call via a communication interface with the thermostat 222. The illustrated process 260 may also include determining (block 264) a number of consecutive cycles between the call and a previous call associated with a quick heat cycle for the modulating furnace 104. In certain embodiments, the controller 180 may store information corresponding to any number of cycles in the memory 184. For example, the controller 180 may receive information from the memory 184 for up to the last 20 cycles (e.g., the last 15 cycles, the last 10 cycles, the last 5 cycles, and so forth). The controller 180 may determine a number of completed consecutive cycles since the last quick heat cycle. For example, the controller 180 may determine five consecutive modulating heat cycles have been completed since the last quick heat cycle.

The controller 180 may also compare (block 266) the number of consecutive modulating heat cycles with a threshold number of cycles, as described herein. The illustrated process 260 may also include determining (block 268) whether the number of consecutive modulating heat cycles falls below or meets or exceeds the threshold cycle amount. For example, the controller 180 may determine the number of consecutive modulating heat cycles is 9 cycles and the threshold number of consecutive modulating heat cycles is 8 cycles. As such, the controller 180 may compare the number of consecutive modulating heat cycles with the threshold number of consecutive modulating heat cycles and determine the number of consecutive modulating heat cycles exceeds the threshold number of consecutive modulating heat cycles (NO path of block 268). Accordingly, the controller 180 may operate (block 270) the modulating furnace 104 in a quick heat operating mode. In certain embodiments, in response to receiving the call and/or determining the number of consecutive modulating heat cycles meets or exceeds the threshold cycle amount, the controller 180 may initiate operation of the modulating furnace 104. For example, the controller 180 may operate the modulating furnace 104 in the quick heat operating mode, as described herein. In certain embodiments, the controller 180 may adjust the modulating gas valve 128 to increase a fuel flow rate of a fuel 124 to a threshold (e.g., maximum) flow rate during the quick heat operating mode. Additionally or alternatively, the controller 180 may adjust the draft inducer blower 154 to produce a threshold (e.g., maximum) flow rate of combustion products (e.g., exhaust gas 160) through the heat exchanger 110.

As another example, the controller 180 may determine the number of consecutive modulating heat cycles is 4 cycles and the threshold number of consecutive modulating heat cycles is 6 cycles. As such, the controller 180 may compare the number of consecutive modulating heat cycles with the threshold number of consecutive modulating heat cycles and determine the number of consecutive modulating heat cycles falls below the threshold number of consecutive modulating heat cycles (YES path of block 268). Accordingly, the controller 180 may operate (block 272) the modulating furnace 104 in the modulating heat operating mode, as described herein. For example, the controller 180 may initiate operation of the modulating furnace 104 in the modulating heat operating mode. In certain embodiments, the controller 180 may adjust the modulating gas valve 128 to decrease the fuel flow rate from the threshold (e.g., maximum) flow rate to a lower flow rate. Additionally or alternatively, the controller 180 may adjust the draft inducer blower 154 to produce a flow rate of combustion products (e.g., exhaust gas 160) through the heat exchanger 110 that is lower than the threshold (e.g., maximum) flow rate.

The present disclosure may provide one or more technical effects useful in the operation of an HVAC system. For example, the disclosed controls scheme employing the disclosed quick heat algorithm may improve efficiency of a modulating heat exchanger and a timeliness of conditioning an environment (e.g., enclosed space) via the modulating heat exchanger.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A controller of a modulating furnace of a heating, ventilation, and air conditioning (HVAC) system, the controller comprising a tangible, non-transitory, computer-readable medium having computer-executable instructions stored thereon that, when executed, are configured to cause processing circuitry to:
   receive a call for heating;
   in response to a number of heating cycles executed by the modulating furnace between the call for heating and a previous call for heating meeting or exceeding a threshold number of heating cycles, associate the call for heating with a quick heat cycle;
   operate the modulating furnace in a quick heat operating mode for a threshold time period in response to the call for heating being associated with the quick heat cycle; and
   subsequent to expiration of the threshold time period, operate the modulating furnace in a modulating heat operating mode based on comparison of a set point temperature of a conditioned space and feedback indicative of a temperature of the conditioned space.

2. The controller of claim 1, wherein the feedback indicative of the temperature of the conditioned space comprises a return air temperature.

3. The controller of claim 1, wherein the computer-executable instructions, when executed, are configured to cause the processing circuitry to:
   determine the number of heating cycles executed by the modulating furnace between the call for heating and the previous call for heating; and
   compare the number of heating cycles to the threshold number of heating cycles.

4. The controller of claim 1, wherein the computer-executable instructions, when executed, are configured to cause the processing circuitry to operate the modulating furnace at a full capacity in the quick heat operating mode.

5. The controller of claim 1, wherein the computer-executable instructions, when executed, are configured to cause the processing circuitry to associate the call for heating with the quick heat cycle in response to a user selection of a quick heat mode via a user interface.

6. The controller of claim 1, wherein the computer-executable instructions, when executed, are configured to cause the processing circuitry to operate the modulating furnace in the modulating heat operating mode for a set time period subsequent to the expiration of the threshold time period.

7. The controller of claim 1, wherein the call for heating comprises a value indicative of a desired temperature differential, a value indicative of the set point temperature, or a first value indicative of a desired temperature and a second value indicative of the temperature of the conditioned space.

8. The controller of claim 1, wherein the computer-executable instructions, when executed, are configured to cause the processing circuitry to instruct a draft inducer blower of the modulating furnace to increase a flow rate of exhaust gas through a heat exchanger of the modulating furnace in response to the call for heating being associated with the quick heat cycle.

9. A heating, ventilation, and air conditioning (HVAC) system, comprising:
a modulating furnace; and
control circuitry configured to:
receive a call for heating;
associate the call for heating with a quick heat cycle based on a number of previous heating cycles executed since a previous call for heating associated with the quick heat cycle meeting or exceeding a threshold number of cycles;
operate the modulating furnace in a quick heat operating mode for a threshold time period in response to the call for heating being associated with the quick heat cycle; and
subsequent to the threshold time period, operate the modulating furnace in a modulating heat operating mode based on comparison of a set point temperature of a conditioned space and feedback indicative of a temperature of the conditioned space.

10. The HVAC system of claim 9, wherein the call for heating is associated with the quick heat cycle based on the control circuitry receiving a user input indicative of a selection of a quick heat mode.

11. The HVAC system of claim 9, wherein the control circuitry is configured to operate the modulating furnace at one hundred percent capacity in the quick heat operating mode.

12. The HVAC system of claim 9, wherein the control circuitry is configured to suspend operation of the modulating furnace based on the temperature of the conditioned space meeting or exceeding the set point temperature of the conditioned space.

13. The HVAC system of claim 9, wherein the modulating furnace comprises:
a burner configured to receive fuel and generate combustion products; and
a modulating gas valve configured to control a flow rate of the fuel directed to the burner.

14. The HVAC system of claim 13, wherein the control circuitry is configured to adjust the modulating gas valve to increase the flow rate of fuel during operation of the modulating furnace to an upper threshold rate in the quick heat operating mode.

15. The HVAC system of claim 9, comprising a draft inducer blower coupled to an outer surface of the modulating furnace, wherein the draft inducer blower is configured to draw exhaust gas through a heat exchanger and to discharge the exhaust gas from the modulating furnace.

16. A heating, ventilation, and air conditioning (HVAC) system, comprising:
a modulating furnace; and
processing circuitry configured to receive a call for heating from a thermostat and, in response to the call for heating, execute a quick heat algorithm to:
determine a number of heating cycles between the call for heating and a previous call for heating associated with a quick heat cycle;
compare the number of heating cycles to a threshold number of cycles;
in response to the number of heating cycles meeting or exceeding the threshold number of cycles, operate the modulating furnace in a quick heat operating mode; and
in response to the number of heating cycles being below the threshold number of cycles, operate the modulating furnace in a modulating heat operating mode.

17. The HVAC system of claim 16, wherein, in response to the number of heating cycles meeting or exceeding the threshold number of cycles, the processing circuitry is configured to:
determine an elapsed time from receiving the call for heating;
compare the elapsed time to a threshold time period; and
operate the modulating furnace in the modulating heat operating mode in response to expiration of the threshold time period.

18. The HVAC system of claim 16, wherein the modulating furnace comprises:
heat exchange tubes configured to receive a heat exchange fluid; and
a blower configured to control a flow rate of the heat exchange fluid through the heat exchange tubes.

19. The HVAC system of claim 18, wherein, in the quick heat operating mode, the processing circuitry is configured to operate the blower to increase the flow rate of the heat exchange fluid to an upper threshold flow rate.

20. The HVAC system of claim 16, wherein, in the quick heat operating mode, the processing circuitry is configured to operate the modulating furnace at a full capacity or a predefined maximum heating capacity.

* * * * *